US008761042B2

(12) United States Patent
Wei

(10) Patent No.: US 8,761,042 B2
(45) Date of Patent: Jun. 24, 2014

(54) METHOD AND SYSTEM FOR INDICATING OVERLOAD INDICATOR REPORT

(75) Inventor: Wei Wei, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 220 days.

(21) Appl. No.: 13/376,883

(22) PCT Filed: Sep. 11, 2009

(86) PCT No.: PCT/CN2009/074119
§ 371 (c)(1),
(2), (4) Date: Dec. 8, 2011

(87) PCT Pub. No.: WO2010/142097
PCT Pub. Date: Dec. 16, 2010

(65) Prior Publication Data
US 2012/0082060 A1    Apr. 5, 2012

(30) Foreign Application Priority Data
Jun. 8, 2009    (CN) .......................... 2009 1 0086843

(51) Int. Cl.
*H04L 12/26*    (2006.01)
*H04W 24/10*    (2009.01)

(52) U.S. Cl.
USPC ........... 370/253; 370/251; 370/252; 455/63.1

(58) Field of Classification Search
USPC ................... 370/253, 328; 455/522; 375/350
See application file for complete search history.

(56) References Cited

U.S. PATENT DOCUMENTS

| 7,796,686 | B2 * | 9/2010 | Arslan | 375/224 |
| 8,059,768 | B2 * | 11/2011 | Zhao et al. | 375/346 |
| 8,423,072 | B2 * | 4/2013 | Whinnett | 455/522 |
| 8,503,364 | B2 * | 8/2013 | Zhang et al. | 370/328 |
| 2009/0180413 | A1 * | 7/2009 | Sutton | 370/311 |
| 2010/0285795 | A1 * | 11/2010 | Whinnett | 455/424 |
| 2011/0013560 | A1 * | 1/2011 | Zhang et al. | 370/328 |

FOREIGN PATENT DOCUMENTS

| CN | 101272549 A | 9/2008 |
| CN | 101299891 A | 11/2008 |

OTHER PUBLICATIONS

International Search Report for PCT/CN2009/074119 Dated Mar. 18, 2010.
Sharp, On overload indicator triggering and reporting format, 3GPP R1-081762, May 9, 2008, pp. 1-3.

(Continued)

*Primary Examiner* — Edan Orgad
*Assistant Examiner* — Emmanuel Maglo
(74) *Attorney, Agent, or Firm* — Banner & Witcoff, Ltd.

(57) ABSTRACT

The present invention discloses a method for indicating an overload indicator (OI) report comprising: a first terminal determining a layer in a coverage area of the first terminal where a second terminal is located, and setting a layer indicating field of the OI report based on the layer; the first terminal determining an OI level resetting threshold, setting an average interference level indicating field of the OI report based on the OI level resetting threshold; and the first terminal resetting levels of the OI based on the OI level resetting threshold, and setting a physical resource block interference state indicating field of the OI report based on the reset levels of the OI. The present invention discloses a system for indicating an overload indicator (OI) report. Based on the method and system, the overhead of the system can be decreased efficiently.

14 Claims, 5 Drawing Sheets

(56) References Cited

OTHER PUBLICATIONS

Nokia Siemens Networks et al., Overload indicator(OI) Configuration and Rreporting Criteria, 3GPP R1-081866, May 9, 2008, pp. 1-3.

ZTE, Discussions on report format for overload indicator, 3GPP R1-081765, May 9, 2008, pp. 1-2.
3GPP TSG RAN WG1#53bis meeting, Warsaw, Poland, Jun. 30-Jul. 5, 2008, Spreadtrum Communications, 6.3, RSRP event-and-timer trigger scheme, Discussion and decision.

* cited by examiner

US 8,761,042 B2

METHOD AND SYSTEM FOR INDICATING OVERLOAD INDICATOR REPORT

TECHNICAL FIELD

The present invention relates to an inter-cell interference technology in the field of wireless communication, and in particular, to a method and a system for indicating an overload indicator (OI) report in solving inter-cell interference.

BACKGROUND ART

In then ext generation wideband communication system, solving inter-cell interference becomes a key factor to improve throughput and average UT throughput of a user terminal (UT), and how to efficiently solve inter-cell interference faces a severe challenge.

Currently, the IEEE (Institute of Electrical and Electronics Engineers) 802.16j, advanced International Mobile Telecommunications (IMT-Advanced) system and WINNER propose to solve the problem of inter-cell interference by using methods such as interference randomization, interference coordination, interference elimination, etc. The LTE (Long Term Evolution) system, based on the methods described above, proposes to divide the coverage area of the current cell into an inner layer and an outer layer based on the strongest interference level of the UT to all adjacent cells, and solve inter-cell interference using methods of partial power control and road loss compensation. The inner layer, which is an area with weaker inter-cell interference, solve the problem of inter-cell interference using full power compensation; while the outer layer, which is an area with stronger inter-cell interference, solve the problem of inter-cell interference using methods of partial power control and road loss compensation.

In a LTE system, an interference state of a PRB (Physical Resource Block) occupied by the UT suffering from a high level of inter-cell interference is indicated in an OI report; and load negotiation is performed between different BSs (Base Station) based on the OI report such that the inter-cell interference suffered by the UT on the PRB is efficiently decreased, thereby achieving the purpose of coordinating inter-cell interference.

Relevant regulations for an OI report in the LTE system will be described below.

Each PRB is configured with an OI value, which is represented by 2 bits and divided into three levels, namely, high (00), middle (01), low (10), which represent respectively levels of inter-cell interference suffered by the PRB, i.e., high interference, middle interference, and low interference.

However, since there are four representation modes, namely, "11", "10", "01" and "00" for 2 bits, which may be used to represent four interference states, and only three interference states are used in the LTE system, one state will be wasted. Therefore, the LTE system fails to efficiently use resources of 2 bits in representing interference states of the PRB, thus causing waste of system resources and increasing overhead of the system.

SUMMARY OF THE INVENTION

In view of this, a main object of the present invention is to provide a method, a terminal and a system for indicating an OI report so as to efficiently decrease overhead of the system.

In order to achieve the above object, the technical scheme of the present invention is implemented as described hereinafter.

The present invention provides a method for indicating an overload indicator report comprising the following steps of:

a first terminal determining a layer in a coverage area of the first terminal where a second terminal is located, and setting a layer indicating field of the overload indicator report based on the layer;

the first terminal determining an overload indicator level resetting threshold, setting an average interference level indicating field of the overload indicator report based on the overload indicator level resetting threshold; and the first terminal resetting levels of the overload indicator based on the overload indicator level resetting threshold, and setting a physical resource block interference state indicating field of the overload indicator report based on the reset levels of the overload indicator.

When the first terminal is a base station, the second terminal may be a relay station or a user terminal; and when the first terminal is a relay station, the second terminal may be a user terminal.

Before the step of the first terminal determining the layer in the coverage area of the first terminal where the second terminal is located, the method may further comprise:

the first terminal dividing its own coverage area based on a preset area dividing threshold to obtain various layers of its own coverage area; and the first terminal setting the levels of the overload indicator based on a preset overload indicator level threshold, and setting a corresponding relationship between the levels of the overload indicator and interference states of the physical resource block.

The step of the first terminal determining the layer in the coverage area of the first terminal where the second terminal is located comprises: the first terminal determining the layer in the coverage area of the first terminal where the second terminal is located based on a maximum strength of inter-cell interference currently suffered by the second terminal.

The method may further comprise:

the first terminal determining the layer where the second terminal is located when determining that the maximum strength of the inter-cell interference currently suffered by the second terminal is less than a preset interference strength comparison threshold.

The step of the first terminal determining the overload indicator level resetting threshold comprises: the first terminal determining the overload indicator level resetting threshold based on interference states of all physical resource blocks occupied by the second terminal.

The step of the first terminal determining the overload indicator level resetting threshold based on the interference states of all the physical resource blocks occupied by the second terminal comprises:

the first terminal counting the interference states of all the physical resource blocks occupied by the second terminal, normalizing the interference states of all the physical resource blocks to obtain an average interference level of the interference states of all the physical resource blocks, and using the average interference level as the overload indicator level resetting threshold.

The step of the first terminal resetting the levels of an overload indicator comprises:

the first terminal resetting the levels of the overload indicator based on the overload indicator level resetting threshold, and setting the corresponding relationship between the reset levels of the overload indicator and the interference states of the physical resource block.

The layer indicating field may be used to indicate the layer of the first terminal where the second terminal is located.

The average interference level indicating field may be used to indicate the average interference level of the interference states of all the physical resource blocks occupied by the second terminal under the layer.

The physical resource block interference state indicating field is used to indicate the interference states of the physical resource block occupied by the second terminal after the levels of the overload indicator are reset.

The method may further comprises: the first terminal setting the reset level indicating field of the overload indicator based on the reset levels of the overload indicator, wherein the reset level indicating field is used to indicate the reset levels of the overload indicator.

The present invention further provides a terminal for supporting indication of an overload indicator report, which is configured to:

determine a layer in an coverage area of the terminal indicating the overload indicator report where another terminal is located, and set a layer indicating field of the overload indicator report based on the layer;

determine an overload indicator level resetting threshold and set an average interference level indicating field of the overload indicator report; and reset levels of the overload indicator based on the overload indicator level resetting threshold, and set a physical resource block interference state indicating field of the overload indicator report.

The above terminal may be further configured to:

determine the layer in the coverage area of the terminal where the another terminal is located based on a maximum strength of inter-cell interference suffered by the another terminal itself and reported by the another terminal; and count interference states of all physical resource blocks occupied by the another terminal, and determine the overload indicator level resetting threshold based on the interference states.

The present invention further provides another terminal supporting indication of an overload indicator report, which is configured to:

report a maximum strength of inter-cell interference suffered by itself and interference states of all physical resource blocks occupied by itself to the terminal described above.

The present invention further provides a system for indicating an overload indicator report comprising a first terminal and a second terminal connected to each other, wherein the first terminal is configured to:

determine a layer in a coverage area of the first terminal where a second terminal is located, and set a layer indicating field of the overload indicator report based on the layer;

determine an overload indicator level resetting threshold, and set an average interference level indicating field of the overload indicator report; and reset levels of the overload indicator based on the overload indicator level resetting threshold, and set a physical resource block interference state indicating field of the overload indicator report.

The second terminal may be configured to report a maximum strength of inter-cell interference suffered by itself to the first terminal.

The first terminal may be further configured to determine the layer in the coverage area of the first terminal where the second terminal is located based on the maximum strength of the inter-cell interference, and count interference states of all physical resource blocks occupied by the second terminal, and determine the overload indicator level resetting threshold based on the interference states.

In the technical scheme for indicating an OI report in accordance with the present invention, interference states of all PRBs occupied by a RS or UT are normalized to obtain an average interference level; the average interference level is used as an OI level resetting threshold to divide levels of the OI. Thus, no matter how many levels the original OI has, after the levels are reset, the OI is divided into only two levels, and the interference states of the PRB also are divided into two states based on the levels of the OI. Therefore, only 1 bit is needed to represent the interference states of the PRB, thus greatly reducing the length of the OI report and saving overhead of the system.

In addition, the OI report of the present invention at least includes a layer indicating field, an average interference level indicating field and a PRB interference state indicating field. Based on values of these fields, the interference situation in the network can be understood more accurately, and the interference can be controlled.

PREFERRED EMBODIMENTS OF THE INVENTION

The technical scheme of the present invention will be further described in detail below in conjunction with the accompanying drawings and the specific embodiments.

A method for indicating an OI report in accordance with the present invention is applicable to both a typical wireless communication network and a wireless communication network with a relay station (RS). The method for indicating the OI report in accordance with the present invention comprises two portions, one is an indicating method for determining the OI report used by a second terminal by using a BS as a first terminal, wherein the second terminal may be a RS or a UT; the other one is an indicating method for determining the OI report used by a second terminal UT through a first terminal, wherein the second terminal may be a BS or a RS.

Figure 1:
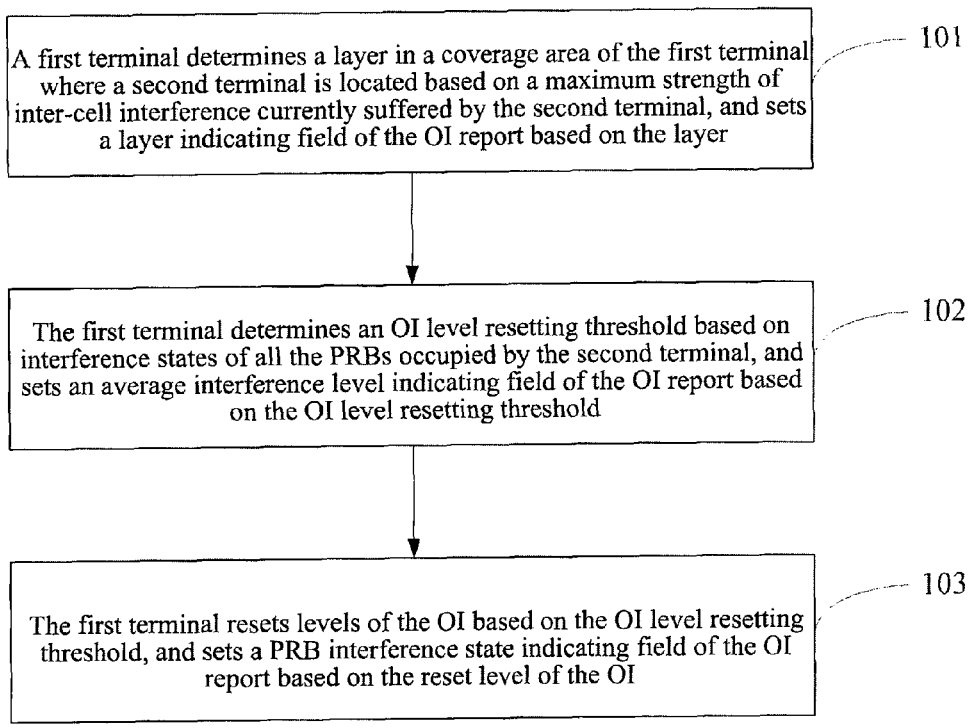
FIG. 1 illustrates a flow chart of a method for indicating an OI report in accordance with the present invention.

FIG. 1 illustrates a flow chart of a method for indicating an OI report in accordance with the present invention comprising the following steps.

Step 101, a first terminal determines a layer in a coverage area of the first terminal where a second terminal is located based on a maximum strength of inter-cell interference currently suffered by the second terminal, and sets a layer indicating field of the OI report based on the layer.

Step 102, the first terminal determines an OI level resetting threshold based on interference states of all PRBs occupied by the second terminal; and sets an average interference level indicating field of the OI report based on the OI level resetting threshold.

Step 103, the first terminal resets levels of an OI based on the OI level resetting threshold, and setting a PRB interference state indicating field of the OI report based on the reset levels of the OI.

Figure 2:
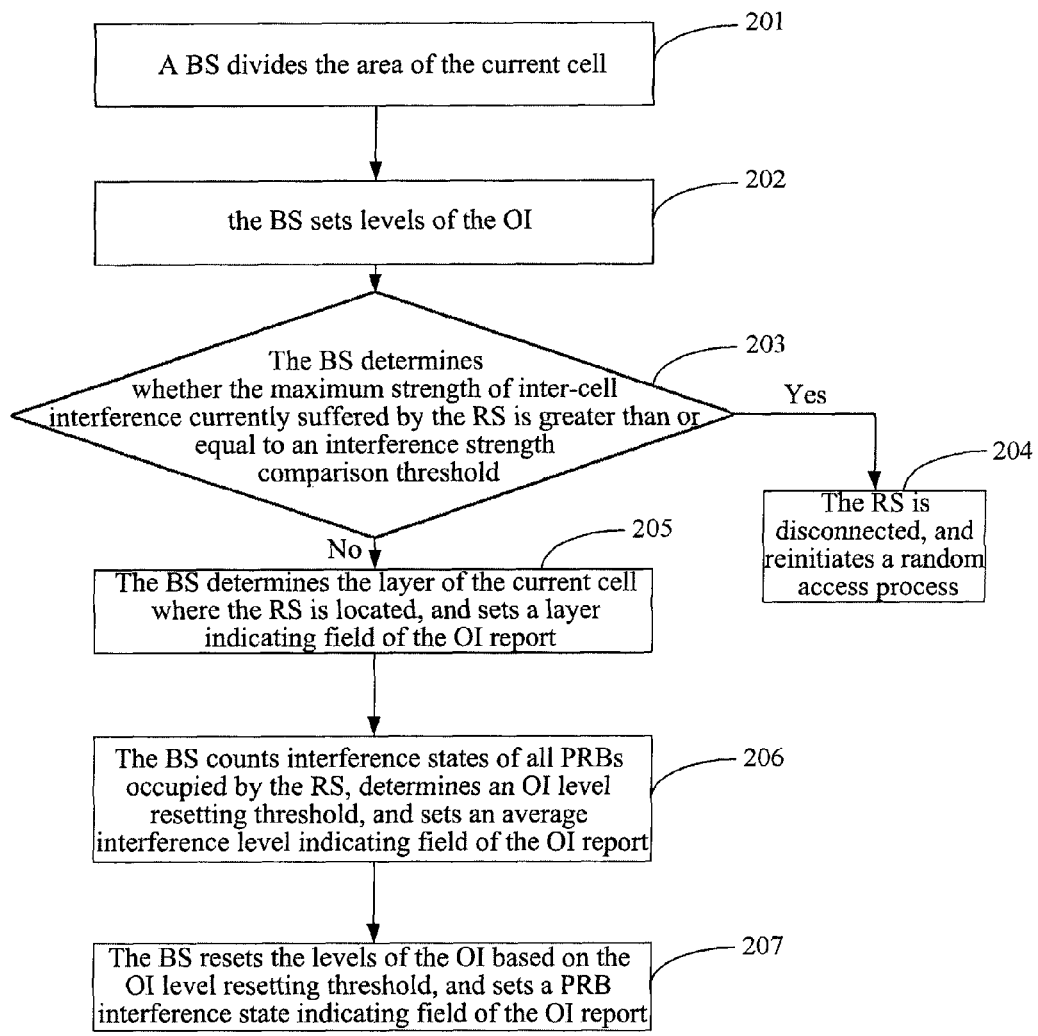
FIG. 2 illustrates a flow chart of a method for indicating an OI report in accordance with the first embodiment of the present invention.

The method for indicating an OI report when the first terminal is a BS and the second terminal is a RS in accordance with the present invention will be described with reference to a specific embodiment. In this flow, the second terminal may also be a UT. As shown in FIG. 2, this flow includes the following steps.

Step 201, the BS divides the area of the current cell.

In the present invention, the area of the cell is divided based on an area division threshold preset in the BS. Preferably, the area division threshold may be set in the following way: the BS determines the strength of interference of each adjacent cell to the current cell and finds out an adjacent cell with the strongest interference, and confirms the interference strengths of an interference signal of the adjacent cell in various places of the current cell, and determines the area division threshold based on the interference strengths. In addition, the area division threshold may also be set in other ways, for example, it can be determined according to a road loss measurement report.

Figure 3:
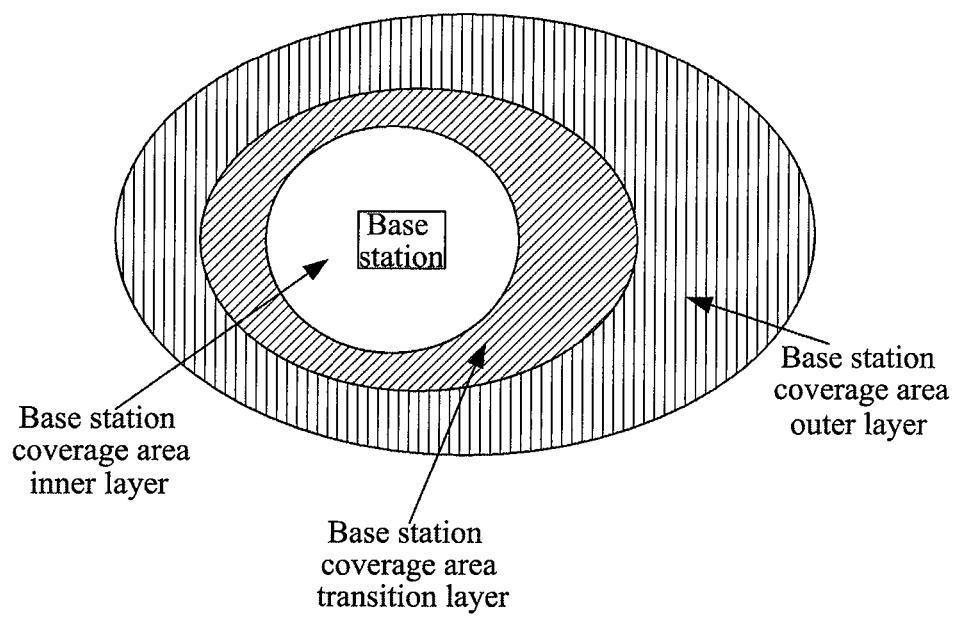
FIG. 3 illustrates a schematic diagram of a layered structure of a wireless communication network in accordance with the first embodiment.

Preferably, two area division thresholds, a first area division threshold and a second area division threshold, may be set. The current cell is divided into three layers, i.e., a first layer, a second layer and a third layer, based on the two preset area division thresholds, wherein the first layer may be an outer layer, the second layer may be a transition layer and the third layer may be an inner layer, as shown in FIG. 3. Thus, the first area division threshold is a transition layer-to-outer layer threshold, and the second area division threshold is an inner layer-to-transition layer threshold.

For example, according to requirements, the area in the current cell suffering from an interference with a strength more than 25% of the interference strength of an adjacent cell suffering from the strongest interference is set as the outer layer, the area suffering from an interference with a strength between 10%-25% is set as the transition layer, and the area suffering from an interference with a strength less than 10% is set as the inner layer. The area division thresholds include an inner layer-to-transition layer threshold 10%, and a transition layer-to-outer layer threshold 25%.

It can be known from the division of the area of the cell described above that:

The strength of the interference suffered by the inner layer is the minimum, and it is believed in practical applications that the strength of inter-cell interference suffered by this area is very low or even zero, therefore, the influence of inter-cell interference on this area can be ignored.

The strength of the interference suffered by the outer layer is the maximum, and in practical applications, the probability that this area suffers from inter-cell interference is very high, and the strength is very large, therefore, the inter-cell interference suffered by this area is required to be processed.

The strength of the interference suffered by the transition layer is between those of the inner layer and the outer layer, and it is believed in practical applications that the inter-cell interference suffered by this area is acceptable.

Step 202, a BS sets levels of the OI.

PRB is time frequency resource, and each PRB has an OI value, which is used to represent a state of inter-cell interference suffered by the PRB. The state of the inter-cell interference suffered by the PRB is determined based on the strength of the inter-cell interference suffered by the PRB itself, and the number of PRBs occupied by the RS is determined by the system based on current traffic of the RS.

The OI values of the PRBs occupied by the RS and the states of inter-cell interference suffered by the PRBs corresponding to the OI values are preset by the BS according to requirements, i.e., the levels of the OI are set.

Preferably, the OI may be divided into three levels based on the preset OI level threshold. The three levels may be represented by 2 bits, that is, the OI values corresponding to the three levels of the OI may be represented as 01, 10, 11.

In the present invention, preferably, the transition layer-to-outer layer threshold may be used as a first OI level threshold, and the inner layer-to-transition layer threshold may be used as a second OI level threshold. According to the levels of the OI, the states of the inter-cell interference suffered by the PRB may be divided into three levels: high interference, middle interference and low interference. Preferably, when the strength of the interference suffered by a PRB is greater than the transition layer-to-outer layer threshold, i.e., the first OI level threshold, the level of the interference state suffered by the PRB is high interference, which is represented by the OI value of 11; when the strength of the interference suffered by a PRB is between the transition layer-to-outer layer threshold, i.e., the first OI level threshold, and the inner layer-to-transition layer threshold, i.e., the second OI level threshold, the level of the interference state suffered by the PRB is middle interference, which is represented by the OI value of 10; when the strength of the interference suffered by a PRB is less than the inner layer-to-transition layer threshold, i.e., the second OI level threshold, the level of the interference state suffered by the PRB is low interference, which is represented by the OI value of 01.

The interference states of the PRBs occupied by the RS are determined using the above-described method for dividing the levels of the OI, as shown in Table 1:

TABLE 1

| PRB index | 1 | 2 | 3 | 4 | 5 | 6 | 7 | 8 | 9 | 10 | 11 | 12 |
|---|---|---|---|---|---|---|---|---|---|---|---|---|
| PRB interference state | 11 | 11 | 10 | 01 | 10 | 11 | 01 | 01 | 10 | 11 | 11 | 10 |

Steps 203-204, the BS determines whether the maximum strength of inter-cell interference currently suffered by the RS is greater than or equal to an interference strength comparison threshold, and if yes, notifies the RS to be disconnected, and reinitiates a random access process; otherwise, performs step 205.

The RS measures the strength of the inter-cell interference currently suffered by itself, and reports the maximum strength of the inter-cell interference suffered by itself to the BS. The RS measuring the strength of the inter-cell interference currently suffered by itself is the prior art, and thus will not be described here.

The BS compares the maximum strength of the inter-cell interference currently suffered by the RS with the interference strength comparison threshold. If the maximum strength of the inter-cell interference currently suffered by the RS is greater than or equal to the interference strength comparison threshold, it is shown that the strength of the inter-cell interference currently suffered by the RS is so high that communication between the RS and the BS has been greatly affected. If the current BS continues to be used as a serving BS of the RS, ideal effect cannot be achieved even by processing of inter-cell interference coordination, at which moment, the current BS notifies the RS to be disconnect and the RS will reinitiate a random access process, i.e., the RS will reselect a suitable serving BS. If the maximum strength of the inter-cell interference currently suffered by the RS is less than the interference strength comparison threshold, step 205 is performed.

The interference strength comparison threshold is an empirical value determined by a telecom operator or a device manufacturer based on factors such as network planning, cell coverage area, BS transmission power, and the like.

Step 205, the BS determines a layer of the current cell where the RS is located, and sets a layer indicating field of the OI report.

The BS compares the maximum strength of the inter-cell interference currently suffered by the RS with the area division threshold. If the maximum strength of the inter-cell interference currently suffered by the RS is greater than the transition layer-to-outer layer threshold, then the RS is located in the outer layer; if the maximum strength of the inter-cell interference currently suffered by the RS is between the inner layer-to-transition layer threshold and the transition layer-to-outer layer threshold, then the RS is located in the transition layer; if the maximum strength of the inter-cell interference currently suffered by the RS is less than the inner layer-to-transition layer threshold, then the RS is located in the inner layer.

Upon knowing the layer where the RS is located, the BS sets the layer indicating field, for example, outer layer, of the OI report, which is used to indicate the layer where the RS is located.

Step 206, the BS count interference states of all PRBs occupied by the RS, determines the OI level resetting threshold, and sets an average interference level indicating field of the OI report.

This step will be described now. The BS counts all the PRBs occupied by the RS, and normalizes the interference states of all the PRBs to obtain an average interference level, which is used as the OI level resetting threshold. Taking the interference states of the PRBs occupied by the RS shown in FIG. 1 as an example, firstly the OI values representing the interference states of the PRBs are represented by decimal digits: 01, 10 and 11 are represented as decimal digits 1 (low interference), 2 (middle interference), and 3 (high interference) respectively, as shown in FIG. 2:

TABLE 2

| PRB index | 1 | 2 | 3 | 4 | 5 | 6 | 7 | 8 | 9 | 10 | 11 | 12 |
|---|---|---|---|---|---|---|---|---|---|---|---|---|
| PRB interference state | 3 | 3 | 1 | 1 | 2 | 3 | 1 | 1 | 2 | 3 | 3 | 2 |

Then the interference states of all the PRBs are normalized to obtain the average interference level of the interference states of all the PRBs. For example, in Table 2, since the number of PRBs with an interference level of 3 is 5, the number of PRBs with an interference level of 2 is 4, and the number of PRBs with an interference level of 1 is 3, the average interference level of the 12 PRBs is: $(3\times5+2\times4+1\times3)/12=2.2$. The average interference level is used as the OI level resetting threshold, and meanwhile the average interference level indicating field of the OI report is set after the layer indicating field is set, and is used to represent the average interference state suffered by the RS in the current layer.

Step 207, the BS resets the levels of the OI based on the OI level resetting threshold, and sets the PRB interference state indicating field of the OI report.

Based on the OI level resetting threshold, the OI may be reset as two levels, which may be preferably represented by 1 bit, i.e., 0 and 1.

Based on the level resetting of the OI, the corresponding relationship between the levels of the OI and the interference states of the PRBs is reset. When an original OI value on a PRB is less than an average interference level, i.e., the OI level resetting threshold, the reset level of the PRB is set as low interference represented by 0; and when an original OI value on a PRB is larger than or equal to an average interference level, i.e., the OI level resetting threshold, the reset level of the PRB is set as high interference represented by 1. The reset PRB interference state is required to be indicated by the PRB interference state indicting field in the OI report.

After the PRB interference states shown in FIG. 1 are reset, they are shown as in FIG. 3:

TABLE 3

| PRB index | 1 | 2 | 3 | 4 | 5 | 6 | 7 | 8 | 9 | 10 | 11 | 12 |
|---|---|---|---|---|---|---|---|---|---|---|---|---|
| PRB interference state | 1 | 1 | 0 | 0 | 0 | 1 | 0 | 0 | 0 | 1 | 1 | 0 |

Therefore, when the OI levels are encoded using 2 bits, according to the example of Table 1, a field indicating the PRB interference states in the OI report needs $12\times2$ bits=24 bits in total. But in the present invention, when the OI levels are encoded using 1 bits, based on the example of Table 3, only $12\times1$ bit=12 bits are needed. Therefore, the overhead of the system is reduced by 12 bits, which brings significant saving of system overhead.

In addition, no matter how many levels the original OI has, there are only two levels, i.e., 1 (high interference) and 0 (low interference), eventually according to the manner for dividing the levels of the OI of the present invention. Thus, the length of the field of the OI report is greatly decreased, and system resources of 1 bit are efficiently utilized.

The OI report of the present invention at least contains a layer indicating field, an average interference level indicating field and a PRB interference state indicating field.

In addition, the OI report of the present invention may further contain a reset level indicating field used to indicate the manner for dividing the reset levels of the OI. For example, if there are two levels represented by 1 bit. Thus, the interference in the network can be controlled more accurately through this field in the OI report.

Figure 4:
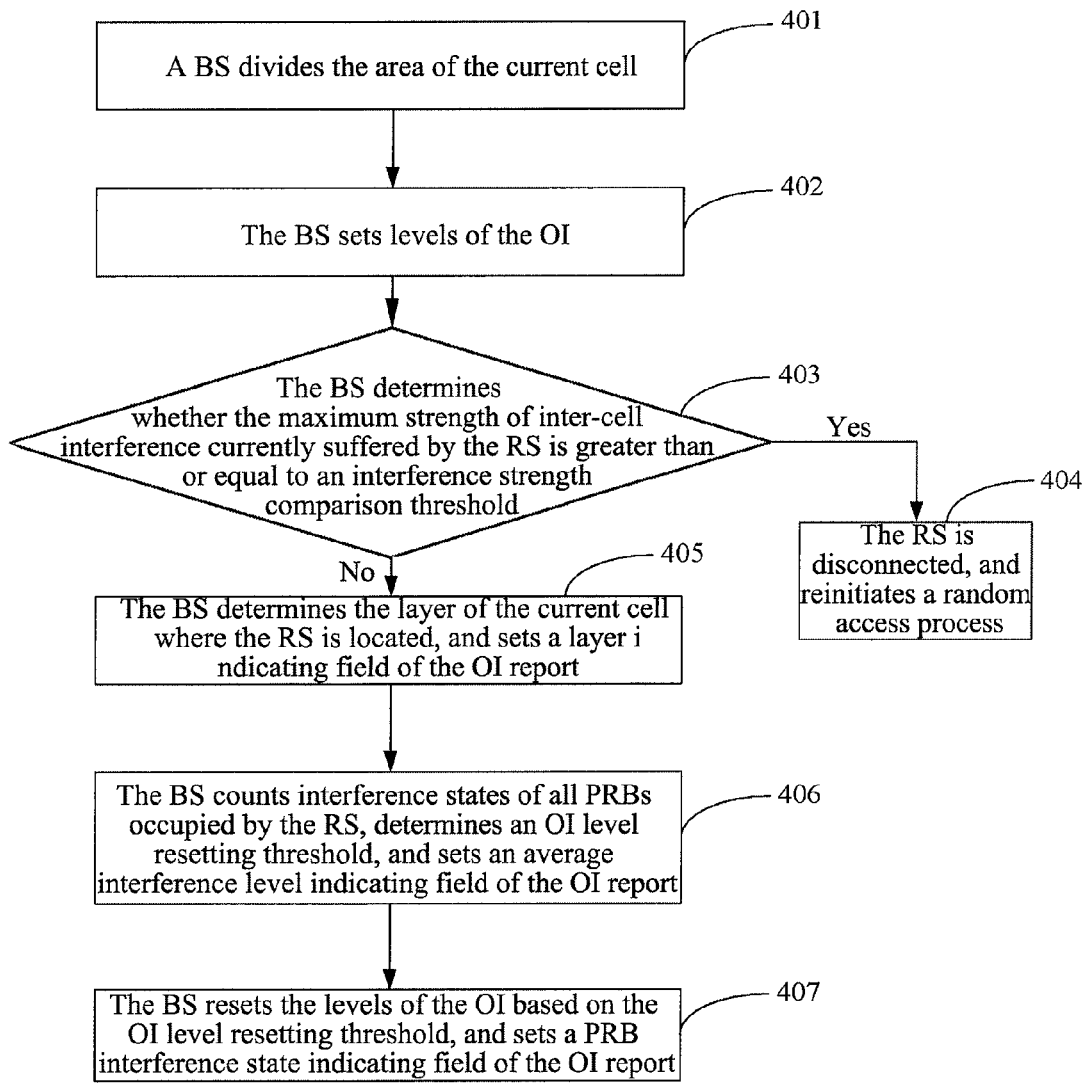
FIG. 4 illustrates a flow char of a method for indicating an OI report in accordance with the second embodiment of the present invention.

When the first terminal is a RS, and the second terminal is a UT, as shown in FIG. 4, a method for indicating an OI report in accordance with the present invention comprises the following steps.

Step 401, the RS divides its coverage area.

When the coverage area of the RS is divided, the BS presets an area division threshold of the RS, and sends the area division threshold to the RS, and then the RS divides its coverage area based on the area division threshold. Preferably, the method for the RS to set the area division threshold is the same way as that in step 101. It should be noted that since the coverage area of the RS may be within the scope of a cell or across multiple cells, and there may be multiple RSs within one cell, there may be a cell in an area adjacent to the coverage area of the current RS or there may be coverage areas of other RSs. The current RS needs to confirm the area with the strongest interference strength among its adjacent areas, and confirm the maximum interference strength generated by an interference signal of the area with the strongest interference strength and reports it to the BS, and then the BS sets the area division threshold of the RS based on the maximum interference strength.

Preferably, the coverage area of the RS may also be divided into an inner layer, a transition layer and an outer layer.

Step 402, the RS sets the levels of the OI.

This step is implemented by the BS by controlling the RS and will be described specifically. The BS determines the levels of the OI and the PRB interference state corresponding to the OI value of each level for the RS, and sends them to the RS through uplink authorization. Then, the RS determines the levels of the OI and the PRB interference state corresponding to the OI value of each level for the UT based on the information sent by the BS.

According to the method of step 202, preferably, the RS may also divide the OI on the PRB occupied by the UT into three levels represented by 2 bits. The OI values corresponding to the three levels of the OI may be represented as 01, 10 and 11. The PRB interference states are also divided into high interference, middle interference and low interference, accordingly, so the corresponding relationship between the OI values and the PRB interference states may be: 11 corresponds to high interference, 10 corresponds to middle interference, and 01 corresponds to low interference.

Steps 403-404, the RS determines whether the maximum strength of inter-cell interference currently suffered by the UT is greater than or equal to the interference strength comparison threshold, and if yes, notifies the UT to be disconnected and reinitiates a random access process; otherwise, performs step 405.

The UT measures the strength of the inter-cell interference currently suffered by itself, and reports the maximum strength of the inter-cell interference suffered by itself to the RS. The UT measuring the strength of the inter-cell interference currently suffered by itself is the prior art, and thus will not be described here.

The RS compares the maximum strength of the inter-cell interference currently suffered by the UT with the interference strength comparison threshold, and the determining method of this step is the same as that in step 203 and thus will not be described here. The interference strength comparison threshold is an empirical value determined by a telecom operator or a device manufacturer based on factors such as network planning, cell coverage area, BS transmission power, and the like.

Step 405, the RS determines a layer of the coverage area of the RS where the UT is located, and sets a layer indicating field of the OI report.

The RS compares the maximum strength of the inter-cell interference currently suffered by the UT with the area division threshold of the RS, and the specific determining method is the same as that in step 205 and will not be described here.

Upon knowing the layer where the RS is located, the BS sets the layer indicating field, for example, outer layer, of the OI report, which is used to indicate the layer where the RS is located.

Step 406, the RS counts the interference states of all the PRBs occupied by the UT, determines the OI level resetting threshold, and sets the average interference level indicating field of the OI report.

The implementation of this step is described with reference to step 206. It should be noted that the RS counts all the PRBs occupied by the UT and reports them to the BS. Then the BS normalizes the interference states of all the PRBs to obtain an average interference level, which is used as the OI level resetting threshold, and sets the average interference level indicating field of the OI report.

Step 407, the RS resets the levels of the OI based on the OI level resetting threshold, and sets the PRB interference state indicating field in the OI report.

The BS resets the levels of the OI and the PRB interference state corresponding to the OI value of each level based on the OI level resetting threshold, and sends them to the RS through uplink authorization. Then the RS resets the levels of the OI and the PRB interference state corresponding to the OI value of each level for the UT based on the information sent by the BS. Two levels, 1 (high interference) and 0 (low interference), are generated according to the manner for resetting the levels of the OI as shown in step 207. The PRB interference state indicting field in the OI report is set by the BS.

The OI report for the UT at least includes a layer indicating field, an average interference level indicating field and a PRB interference state indicating field.

In addition, the OI report may further comprise are set level indicating field used to indicate the manner for dividing the reset levels of the OI. For example, there are two levels represented by 1 bit. Thus, the interference in the network can be controlled more accurately through this field in the OI report. The above indicating fields in the OI report are all set by the BS.

Figure 5:
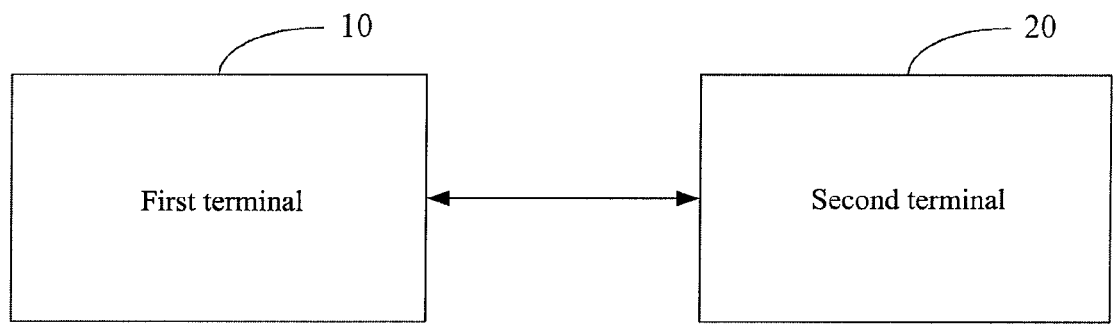
FIG. 5 illustrates a structure relationship of a system for indicating an OI report in accordance with the present invention.

In order to implement the above method, the present invention provides a system for indicating an OI report as shown in FIG. 5, which comprises a first terminal 10 and a second terminal 20 connected to each other.

The first terminal 10 determines a layer in a coverage area of the first terminal 10 where a second terminal 20 is located, and sets a layer indicating field of the overload indicator report based on the layer.

The first terminal 10 determines an overload indicator level resetting threshold, and sets an average interference level indicating field of the overload indicator report.

The first terminal 10 resets levels of an overload indicator based on the overload indicator level resetting threshold, and sets a physical resource block interference state indicating field of the overload indicator report.

The second terminal 20 is configured to report the maximum strength of inter-cell interference suffered by itself to the first terminal 10. The first terminal 10 determines the layer in the coverage area of the first terminal 10 where the second terminal 20 is located based on the maximum strength of the inter-cell interference.

The first terminal 10 is also configured to count interference states of all physical resource blocks occupied by the second terminal 20, and determine the overload indicator level resetting threshold based on the interference states.

The above embodiments are only preferred examples of the present invention, and are not intended to limit the protection scope of the present invention.

Industrial Applicability

In the technical scheme for indicating an OI report in accordance with the present invention, interference states of all PRBs occupied by a RS or UT are normalized to obtain an average interference level; the average interference level is used as an OI level resetting threshold to divide levels of the OI. Thus, no matter how many levels the original OI has, after the levels are reset, the OI is divided into only two levels, and the interference states of the PRB also are divided into two states based on the levels of the OI. Therefore, only 1 bit is needed to represent the interference states of the PRB, thus greatly reducing the length of the OI report and saving overhead of the system.

In addition, the OI report of the present invention at least includes a layer indicating field, an average interference level indicating field and a PRB interference state indicating field. Based on values of these fields, the interference situation in the network can be understood more accurately, and the interference can be controlled.

What is claimed is:

1. A method for indicating an overload indicator report comprising the following steps of:

a first terminal determining a layer in a coverage area of the first terminal where a second terminal is located, and setting a layer indicating field of the overload indicator report based on the layer;

the first terminal determining an overload indicator level resetting threshold based on interference states of all physical resource blocks occupied by the second terminal, setting an average interference level indicating field of the overload indicator report based on the overload indicator level resetting threshold; and the first terminal resetting levels of the overload indicator based on the overload indicator level resetting threshold, and setting a physical resource block interference state indicating field of the overload indicator report based on the reset levels of the overload indicator; and the first terminal counting the interference states of all the physical resource blocks occupied by the second terminal to obtain an average interference level of the interference states of all the physical resource blocks, and using the average interference level as the overload indicator level resetting threshold.

2. The method according to claim 1, wherein when the first terminal is a base station, the second terminal is a relay station or a user terminal; and when the first terminal is a relay station, the second terminal is user terminal.

3. The method according to claim 1, wherein before the step of the first terminal determining the layer in the coverage area of the first terminal where the second terminal is located, the method further comprises:

the first terminal dividing its own coverage area based on a preset area dividing threshold to obtain various layers of its own coverage area; and the first terminal setting the levels of the overload indicator based on a preset overload indicator level threshold, and setting a corresponding relationship between the levels of the overload indicator and interference states of the physical resource block.

4. The method according to claim 1, wherein the step of the first terminal determining the layer in the coverage area of the first terminal where the second terminal is located comprises:
the first terminal determining the layer in the coverage area of the first terminal where the second terminal is located based on a maximum strength of inter-cell interference currently suffered by the second terminal.

5. The method according to claim 1, wherein the step of the first terminal resetting the levels of an overload indicator comprises:

the first terminal resetting the levels of the overload indicator based on the overload indicator level resetting threshold, and setting the corresponding relationship between the reset levels of the overload indicator and the interference states of the physical resource block.

6. The method according to claim 2, wherein the step of the first terminal resetting the levels of an overload indicator comprises:

the first terminal resetting the levels of the overload indicator based on the overload indicator level resetting threshold, and setting the corresponding relationship between the reset levels of the overload indicator and the interference states of the physical resource block.

7. The method according to claim 3, wherein the step of the first terminal resetting the levels of an overload indicator comprises:

the first terminal resetting the levels of the overload indicator based on the overload indicator level resetting threshold, and setting the corresponding relationship between the reset levels of the overload indicator and the interference states of the physical resource block.

8. The method according to claim 4, further comprising:
the first terminal determining the layer where the second terminal is located when determining that the maximum strength of the inter-cell interference currently suffered by the second terminal is less than a preset interference strength comparison threshold.

9. The method according to claim 4, wherein the step of the first terminal resetting the levels of an overload indicator comprises:

the first terminal resetting the levels of the overload indicator based on the overload indicator level resetting threshold, and setting the corresponding relationship between the reset levels of the overload indicator and the interference states of the physical resource block.

10. The method according to claim 5, wherein
the layer indicating field is used to indicate the layer of the first terminal where the second terminal is located;

the average interference level indicating field is used to indicate the average interference level of the interference states of all the physical resource blocks occupied by the second terminal under the layer; and the physical resource block interference state indicating field is used to indicate the interference states of the physical resource block occupied by the second terminal after the levels of the overload indicator are reset.

11. The method according to claim 8, wherein the step of the first terminal resetting the levels of an overload indicator comprises:

the first terminal resetting the levels of the overload indicator based on the overload indicator level resetting threshold, and setting the corresponding relationship between the reset levels of the overload indicator and the interference states of the physical resource block.

12. The method according to claim 10, further comprising:
the first terminal setting the reset level indicating field of the overload indicator based on the reset levels of the overload indicator, wherein the reset level indicating field is used to indicate the reset levels of the overload indicator.

13. A terminal for supporting indication of an overload indicator report, comprising a processor, wherein the terminal is configured to:

determine a layer in an coverage area of the terminal indicating the overload indicator report where another terminal is located, and set a layer indicating field of the overload indicator report based on the layer;

determine an overload indicator level resetting threshold and set an average interference level indicating field of the overload indicator report; and reset levels of the overload indicator based on the overload indicator level resetting threshold, and set a physical resource block interference state indicating field of the overload indicator report; wherein, the terminal is further configured to:
determine the layer in the coverage area of the terminal where the another terminal is located based on a maximum strength of inter-cell interference suffered by the another terminal itself and reported by the another terminal; and count interference states of all physical resource blocks occupied by the another terminal, and determine the overload indicator level resetting threshold based on the interference states.

14. A system for indicating an overload indicator report comprising a first terminal and a second terminal connected to each other, wherein the first terminal is configured to:
- determine a layer in a coverage area of the first terminal where a second terminal is located, and set a layer indicating field of the overload indicator report based on the layer;
- determine an overload indicator level resetting threshold, and set an average interference level indicating field of the overload indicator report; and
- reset levels of the overload indicator based on the overload indicator level resetting threshold, and set a physical resource block interference state indicating field of the overload indicator report; wherein
- the second terminal is configured to report a maximum strength of inter-cell interference suffered by itself to the first terminal; and
- the first terminal is further configured to determine the layer in the coverage area of the first terminal where the second terminal is located based on the maximum strength of the inter-cell interference, and count interference states of all physical resource blocks occupied by the second terminal, and determine the overload indicator level resetting threshold based on the interference states.

* * * * *